United States Patent
Lin et al.

(10) Patent No.: US 9,540,096 B2
(45) Date of Patent: Jan. 10, 2017

(54) FLY-BY-WIRE FLIGHT CONTROL SYSTEM AND METHOD

(71) Applicant: BOMBARDIER INC., Dorval (CA)

(72) Inventors: Shu Lin, Markham (CA); Timothy Smith, Dollard-Des-Ormeaux (CA); Pierre De Serres, St. Laurent (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 14/925,623

(22) Filed: Oct. 28, 2015

(65) Prior Publication Data

US 2016/0114882 A1 Apr. 28, 2016

Related U.S. Application Data

(63) Continuation of application No. 14/324,831, filed on Jul. 7, 2014, which is a continuation of application (Continued)

(51) Int. Cl.
*B64C 13/04* (2006.01)
*B64C 13/50* (2006.01)
(Continued)

(52) U.S. Cl.
CPC .............. *B64C 13/503* (2013.01); *B64C 13/04* (2013.01); *B64C 19/00* (2013.01); *G05D 1/0077* (2013.01)

(58) Field of Classification Search
CPC .......... B64C 13/00; B64C 13/12; B64C 13/04; B64C 13/503; G05D 1/08; G05D 1/0808; G05D 1/101
(Continued)

(56) References Cited

U.S. PATENT DOCUMENTS 4,472,780 A 9/1984 Chenoweth et al.
4,598,890 A 7/1986 Herzog et al.
(Continued)

FOREIGN PATENT DOCUMENTS

WO 2007018652 A1 2/2007

OTHER PUBLICATIONS

International Search Report from PCT/GB2008/050216.
(Continued)

*Primary Examiner* — David H Bollinger
(74) *Attorney, Agent, or Firm* — BCF LLP

(57) ABSTRACT

A multi-axis serially redundant, single channel, multi-path fly-by-wire control system comprising: serially redundant flight control computers in a single channel where only one "primary" flight control computer is active and controlling at any given time; a matrix of parallel flight control surface controllers including stabilizer motor control units (SMCU) and actuator electronics control modules (AECM) define multiple control paths within the single channel, each implemented with dissimilar hardware and which each control the movement of a distributed set of flight control surfaces on the aircraft in response to flight control surface commands of the primary flight control computer; and a set of (pilot and co-pilot) controls and aircraft surface/reference/navigation sensors and systems which provide input to a primary flight control computer and are used to generate the flight control surface commands to control the aircraft in flight in accordance with the control law algorithms implemented in the flight control computers.

9 Claims, 9 Drawing Sheets

Related U.S. Application Data

No. 13/743,076, filed on Jan. 16, 2013, now Pat. No. 8,818,575, which is a continuation of application No. 12/594,533, filed as application No. PCT/GB2008/050216 on Mar. 26, 2008, now Pat. No. 8,386,093.

(60) Provisional application No. 60/921,955, filed on Apr. 5, 2007.

(51) Int. Cl.
*G05D 1/00* (2006.01)
*B64C 19/00* (2006.01)

(58) Field of Classification Search
USPC .................. 701/3, 4; 244/221, 228, 237
See application file for complete search history.

(56) References Cited

U.S. PATENT DOCUMENTS

| | | | |
|---|---|---|---|
| 4,649,484 A | 3/1987 | Herzog et al. | |
| 4,807,516 A | 2/1989 | Takats | |
| 5,493,497 A | 2/1996 | Buus | |
| 5,550,736 A | 8/1996 | Hay et al. | |
| 6,059,225 A | 5/2000 | Vidal et al. | |
| 6,446,911 B1 | 9/2002 | Yount et al. | |
| 6,561,463 B1 | 5/2003 | Yount et al. | |
| 6,704,624 B2 | 3/2004 | Ortega et al. | |
| 6,860,452 B2 | 3/2005 | Bacon et al. | |
| 7,702,429 B2 * | 4/2010 | Lavergne | G05D 1/0607 244/178 |
| 8,386,093 B2 | 2/2013 | Lin et al. | |
| 8,538,602 B2 | 9/2013 | Brot | |
| 8,818,575 B2 | 8/2014 | Lin et al. | |
| 2006/0100750 A1 | 5/2006 | Platzer et al. | |
| 2007/0135975 A1 * | 6/2007 | Stange | B64C 13/503 701/3 |
| 2007/0271008 A1 | 11/2007 | Ciholas et al. | |
| 2008/0079381 A1 | 4/2008 | Hanlon et al. | |
| 2008/0099629 A1 * | 5/2008 | Abel | B64C 13/503 244/223 |
| 2008/0142642 A1 * | 6/2008 | Marino | B64C 13/503 244/223 |
| 2008/0156939 A1 * | 7/2008 | Hanlon | B64C 13/503 244/223 |
| 2009/0187292 A1 | 7/2009 | Hreha et al. | |

OTHER PUBLICATIONS

Tomayk, "Computers take flight—A history of NASA's pioneering digital fly-by-wire project", NASA SP 2000-4224, 2000.
NASA Technical Note, "Description and flight test results of the NASA F-8 digital fly-by-wire control system", NASA TN D-7843, 1974.
Regenie et al., "Experience With Synchronous and Asynchronous Digital Control System", NASA technical memorandum 88271, 1986.
Szalai et al., "Digital Fly-By-Wire Flight Control Validation Experience", NASA technical memorandum 72860, 1978.
Moxon, "French Revolution—Dassault's fly-by-wire Falcon 7X long-renge business jet is a ground-breaking design manufactured in a radically new way . . . ", Flight International, Jun. 2005, pp. 90-101.

* cited by examiner

FLY-BY-WIRE FLIGHT CONTROL SYSTEM AND METHOD

CROSS-REFERENCES TO RELATED APPLICATIONS

This application is a continuation of U.S. patent application Ser. No. 14/324,831, filed on Jul. 7, 2014 which is a continuation of U.S. patent application Ser. No. 13/743,076, filed on Jan. 16, 2013, which has matured into U.S. Pat. No. 8,818,575 and which is a continuation of U.S. patent application Ser. No. 12/594,533, filed on Aug. 11, 2010, which has matured into U.S. Pat. No. 8,386,093 and which is the National Stage of International Patent Application No. PCT/GB2008/050216, filed on Mar. 26, 2008, which claims priority to U.S. Provisional Application 60/921,955, filed on Apr. 5, 2007. The contents of all five applications are hereby incorporated by reference in their entirety.

FIELD OF THE INVENTION

The present invention generally relates to aircraft control systems and, in particular, to a multi-axis serially redundant, single channel, multi-path fly-by-wire flight control system.

BACKGROUND OF THE INVENTION

Fly-by-wire technology has provided a major advance in aircraft flight control systems.

Mechanical flight control systems had been prevalent where the flight control surfaces on an aircraft were controlled using a system of cables, linkages and mechanical controls as the primary and usually only control paths. Only limited, basic mechanical failure mode contingency was possible in such systems.

With the advent of electronics and computer-aided flight controls, mechanical systems were given enhanced controllability through augmentation with, e.g., electrical drive assist and controls.

Such improvements allowed for the development of advanced control laws that, among other things, improve and increase aircraft controllability and performance. These control laws can be complex and their implementation in a mechanical control system, even those with electronic assistance, is difficult and often results in significant increase in aircraft weight.

As the next step in relevant technological evolution, mechanical linkages (rods, cables, arms, etc) were replaced by motors, actuators and drives with associated wiring as so-called "fly-by-wire" technologies were developed.

A simplified diagram of a known fly-by-wire (FBW) system is shown in FIG. 1. In such a fly-by-wire system, there is no direct mechanical coupling between the pilot controls 10 and a flight control surface 20. Known fly-by-wire systems include for example, a set of pilot controls 10 which provide electrical signals to aircraft electronics 24, where they are combined with other airplane data to produce flight control surface commands. Instead of mechanical linkages and their attendant displacement/translation, the commands are transmitted across wires 38 to electrically control the movement of actuator/motors 26 that move the flight control surfaces 20.

For purposes of safety, fly-by-wire systems typically include redundant components so that if one component of the system fails, the aircraft can still be safely controlled. In such prior art systems, it is known to provide redundancy on an axis-by-axis basis. For example as shown in FIG. 2, some prior art fly-by-wire architectures have separate systems that control the movement of the aircraft in each of the roll, pitch and yaw axes.

In these prior art systems, each axis control system typically included a dedicated primary flight computer/processor and a back-up flight computer/processor that control movement of the aircraft in a particular axis. If the primary flight computer/processor that controls one axis were also to fail, the back-up computer/processor would engage to control that axis of the aircraft. Similarly, the other axis systems would each include a primary and back-up flight computer/processor. However, if the back-up computer/processor in a particular axis channel were to fail, the computers/processors in the other axis channels could not function to fly the aircraft in the failed axis.

As an improvement to such systems, redundant multi-channel, multi-axes, fly-by-wire control systems such as shown in FIG. 3 were introduced, in which the fly-by-wire system is divided into a series of parallel independent control channels, each channel capable of flying the aircraft. Each control channel is substantially isolated from the other control channels such that the channels operate in parallel and provide redundancy where in the event of a malfunction in or of one channel, the continued operation of the remaining channels is not affected and multi-axis controllability is maintained.

With reference to FIGS. 3 and 4, one such prior art fly-by-wire system includes three isolated identical control channels—a left flight control channel 60, a center flight control channel 80 and a right flight control channel 90—each channel having its own dedicated primary flight computer 64, 84 or 94 and actuator control electronics unit (ACE) 62, 82 or 92, the ACE controlling a set of associated flight control surfaces 66. Each flight control channel is fully redundant and can control all axes of the aircraft.

As shown in FIG. 4, pilot/co-pilot control inputs (via respective transducer signals) are provided to each of ACEs 62, 82, and 92 which then make available the transducer signal over its designated one of three data buses 40, 42, and 44. The primary flight computers 64, 84, and 94 each receives transducer signals from each of the three data buses 40, 42, and 44. Each of the primary flight computers (left 64, center 84 and right 94) selects one of the transducer signals received from one of the three ACEs to use in generating a set of flight surface commands, which particular transducer signal is selected by the flight computers is based on predetermined selection rules. After selecting a transducer signal from one of the three ACEs, left primary flight computer 64 generates a set of proposed flight surface commands which are then transmitted over the data bus 40, while the center and right primary flight computers 84 and 94 transmit their sets of proposed flight surface commands on the center and right data buses 42, and 44, respectively. The left primary flight computer 64 compares the set of proposed flight surface commands it has generated with the proposed flight surface commands generated by each of the other primary flight computers 84 and 94. In a mid-value select block 379a, the left primary flight computer 64 selects the middle value of each of the flight surface commands. The left primary flight computer 64 then transmits the selected middle values of the flight surface commands over the left data bus 40, while the center and right primary flight computers transmit their selected middle value flight surface commands on the center and right data buses 42 and 44. The ACEs 62, 82 and 92 receive the respective sets of flight surface commands generated by each of the primary flight computers 64, 84, and 94. The left ACE 62 selects one of the sets of flight surface commands generated by one of the three primary flight computers in accordance with the signal select function of an input signal management block where the ACE selects the commands from the flight control computer in its own channel. Once the ACE 62 has selected a set of flight surface commands, it applies the selected set of flight surface commands to a servo loop, which controls an actuator 558a that moves the appropriate aircraft control surface. The operation of the center primary flight computer 84 and the right primary flight computer 94 are the same as that of the left primary flight computer 64 described.

In this fashion, this prior art fly-by-wire control system demonstrates a plurality of independent and isolated flight control channels each channel including an actuator controller electronics unit (ACE) that receives transducer signals that are indicative of the position of the pilot controls and a primary flight computer that is coupled to that ACE and which generates flight surface commands based on the transducer signals received from the ACE. The ACE in each isolated flight control channel receives the flight surface commands from the corresponding primary flight computer and sends the commands to a plurality of servo loops that control the movement of a set of flight control surfaces on the aircraft.

In this known system, each of the plurality of flight control channels is an independent, isolated, control channel, each of the plurality of flight control channels is of identical configuration, and all of the plurality of channels operate in parallel, with redundancy incorporated through the parallel operation.

The set of flight control surfaces controlled by each isolated flight control channel is selected so that operation of a single isolated flight control channel is sufficient to fly the aircraft in the event that the remaining isolated flight control channels fail, further characterizing the independent, isolated and redundant nature and aforementioned structure of this known flight control channel.

The foregoing is believed to describe the prior art systems as set forth, for example, in U.S. Pat. No. 5,493,497.

Such parallel structure requires that all independent channels are active in normal mode function and operate in a synchronized (e.g., real-time) fashion. Failure mode monitoring requires flight control commands to be constantly compared between the simultaneously operating redundant control channels. In the failure operation of these types of systems, if one primary flight computer fails, the remaining ones continue to operate all channels under a failure management scheme and control the aircraft.

While the above prior art fly-by-wire system provides redundant control channels such that the aircraft can be controlled safely by one channel in case of failures of other channels, one drawback of the prior art is that a generic fault at the ACE level (e.g., batch failure—manufacturing defects) could affect all ACEs, which could degrade the controllability of all surfaces. Another drawback is the need for duplicative components to achieve functional operation of such prior art redundant system.

SUMMARY OF THE INVENTION

The present invention provides advancements in the state of the relevant art by, inter alia, providing a multi-axis serially redundant, single channel, multi-path, generic fault tolerant fly-by-wire aircraft control system in which internal architectural dissimilarities are provided for all critical flight control electronics such that the aircraft can be controlled safely in case of multiple control electronics failures and the system is also fault tolerant to a generic fault of computer/processor, or a generic fault of other complex hardware.

In accordance with an embodiment, the present technology provides a fly-by-wire flight control system of an aircraft, the system comprising:
    a plurality of input controls, each one of the plurality of input controls being capable of generating a signal indicative of a commanded position of at least one flight control surface;
    a plurality of flight control computers, each one of the plurality of flight control computers being capable of generating flight surface control commands according to predetermined flight control algorithms in part as a function of the signal, wherein at least one of the plurality of flight control computers is capable of determining that it is invalid based on a self-testing regime; and
    a plurality of flight control surface controllers, each one of the plurality of flight control surface controllers being capable of controlling the at least one flight control surface based on at least one of (i) the flight surface control commands generated by at least one of the plurality of flight control computers and (ii) the signal.

In another aspect, at least another one of the plurality of flight control computers is capable of becoming an active primary flight control computer upon determination by the at least one of the plurality of flight control computers that it is invalid.

In yet another aspect, at least one of the plurality of flight control surface controllers, upon determining that none of the plurality of flight control computers is capable of becoming an active primary flight control computer, is capable of being commanded according to predetermined flight control algorithms for direct mode operation in response to the signal.

In another aspect, the at least one of the plurality of flight control computers comprises a command lane and a monitor lane capable of comparing against one another.

In yet another aspect, the self-testing is configured so that a discrepancy outside a predetermined tolerance between the command lane and the monitor lane results in the at least one of the plurality of flight control computers setting its status as invalid.

In another aspect, the self-testing is configured so that a discrepancy outside a predetermined tolerance between the command lane and the monitor lane results in the at least one of the plurality of flight control computers taking itself offline.

In yet another aspect, at least one of the plurality of flight control surface controllers is being indicated that the status of the at least one of the plurality of flight control computers is invalid.

In another aspect, the command lane and the monitor lane have dissimilar processors.

In yet another aspect, the at least another one of the plurality of flight control computers is capable of becoming the active primary flight control computer based on (i) a determination by the at least one of the plurality of flight control computers that it is invalid and (ii) a priority logic.

In another aspect, a validity block configured to detect whether no valid flight control computer amongst the plurality of flight control computers is available and further configured to instruct a switching block to disconnect flight surface control commands and to connect direct mode control.

In accordance with another embodiment, the present technology provides a flight control computer for an aircraft, the flight control computer comprising:
- a receiving module for receiving a signal indicative of a commanded position of at least one flight control surface of the aircraft, the signal being generated by at least one input control;
- a first processor configured to execute a command lane, the command lane generating flight surface control commands according to predetermined flight control algorithms in part as a function of the signal;
- a second processor configured to execute a monitor lane; and
- a self-testing module configured to compare the command lane against the monitor lane to identify whether the flight control computer is to operate at least one of (i) taking itself offline and (ii) setting its status as invalid.

In another aspect, the self-testing module is configured so as to determine whether a difference between the command lane and the monitor lane is within a predetermined tolerance.

In yet another aspect, the flight control computer further comprises a module configured to determine that the flight control computer is to become an active primary flight control computer upon determination that another flight control computer is invalid.

In accordance with another embodiment, the present technology provides a flight surface controller for an aircraft, the flight surface controller comprising:
- a receiving module for receiving at least one of flight surface control commands and a signal, the flight surface control commands being generated by a flight control computer and the signal being generated by an input control;
- a control module being capable of controlling at least one flight control surface of the aircraft based on at least one of the flight surface control commands and the signal; and
- a command decode logic module capable of determining that no flight control computer is being capable of becoming an active primary flight control computer of the aircraft.

In another aspect, the control module is capable of being commanded according to predetermined flight control algorithms for direct mode operation in response to the signal upon determination, by the command decode logic module, that no flight control computer is being capable of becoming an active primary flight control computer of the aircraft.

In accordance with another embodiment, the present technology provides a method of controlling an aircraft, the method comprising:
- receiving a signal indicative of a commanded position of at least one flight control surface of the aircraft;
- generating, by a first flight control computer, flight surface control commands according to predetermined flight control algorithms in part as a function of the signal;
- upon determining that the first flight control computer is invalid, selecting a second flight control computer to become an active primary flight control computer;
- generating, by the second flight control computer, flight surface control commands according to predetermined flight control algorithms in part as a function of the signal; and
- applying the flight surface control commands to a flight control surface controller, the flight control surface controller being capable of controlling at least one flight control surface of the aircraft.

In another aspect, the method further comprises:
- determining that none of the first flight control computer and the second flight control computer is capable of becoming the active primary flight control computer; and
- commanding the flight control surface controller according to predetermined flight control algorithms for direct mode operation in response to the signal.

In yet another aspect, determining that the first flight control computer is invalid is executed by a self-testing module of the first flight control computer.

In another aspect, the method comprises, upon determining that the first flight control computer is invalid, at least one of (i) taking the first flight control computer offline and (ii) setting the status of the first flight control computer as invalid.

In accordance with another embodiment, the present technology provides a fly-by-wire flight control system of an aircraft, comprising:
- a plurality of input controls, each one of the plurality of input controls being capable of generating a signal indicative of a commanded position of at least one flight control surface;
- a plurality of flight control computers, wherein a first one of the plurality of flight control computers is an active flight control computer capable of generating flight surface control commands according to predetermined flight control algorithms in part as a function of the signal; and
- wherein the first one of the plurality of flight control computers is capable of determining that it is invalid, and a second one of the plurality of flight control computers is capable of becoming the active flight control computer.

In another aspect, each one of the plurality of flight control surface controllers receives flight control commands from each one of the plurality of flight control computers.

In yet another aspect, at least one of the plurality of flight control surface controllers comprises a command decode logic block forwarding only flight control commands from one of the plurality of flight control computers determined as being the primary flight control computer.

In another aspect, only one of the plurality of flight control computers determined as being the primary flight control computer transmits the flight control commands onto a databus connecting the plurality of flight control computers to the plurality of flight control surface controllers.

In yet another aspect, at least one of the plurality of flight control computers is capable of at least one of (i) providing full control functionality in all aircraft axes, (ii) operating independently in an active/standby configuration and (iii) operating with no output command voting/comparison between at least two of the plurality of flight control computers.

In another aspect, each one of the plurality of flight control computers is capable of operating independently in a passive standby mode to serially come on-line as a primary flight control computer in an event of failure of one of the plurality of flight control computers previously determined to be the active primary flight control computer.

In yet another aspect, the system further comprises:
- a plurality of control paths, each one of the plurality of control paths controlling a different subset of a set of flight control surfaces, the flight control surfaces comprising the at least one flight control surface;
- at least one of the plurality of control paths comprising a first flight control surface controller selected amongst the plurality of flight control surface controllers, the first flight control surface controller controlling such a subset of flight control surfaces to adjust an attitude of the aircraft in at least one of a roll axis, a pitch axis and a yaw axis; and at least another one of the plurality of control paths comprising a second flight control surface controller selected amongst the plurality of flight control surface controllers, the second flight control surface controller controlling such a subset of flight control surfaces to control an horizontal stabilizer trim, such that comprehensive control of the aircraft is achieved by an actuator control module in combination with a servo motor control unit.

In accordance with another embodiment, the present technology provides a fly-by-wire flight control system of an aircraft, the system comprising:

a plurality of input controls, each one of the plurality of input controls being capable of generating a signal indicative of a commanded position of at least one flight control surface;

a plurality of flight control computers, each one of the plurality of flight control computers being capable of generating flight surface control commands according to predetermined flight control algorithms in part as a function of the signal, wherein at least one of the plurality of flight control computers is capable of becoming an active primary flight control computer upon determination that another one of the plurality of flight control computers is invalid; and a plurality of flight control surface controllers, each one of the plurality of flight control surface controllers being capable of controlling the at least one flight control surface based on at least one of the flight surface control commands generated by at least one of the plurality of flight control computers and the signal, wherein at least one of the plurality of flight control surface controllers, upon determining that none of the plurality of flight control computers being capable of becoming an active primary flight control computer, is capable of being commanded according to predetermined flight control algorithms for direct mode operation in response to the signal.

In another aspect, determining that the first flight control computer is invalid is based on a comparison of a command lane and a monitor lane of the first flight control computer.

It will be appreciated by those skilled in the art that the foregoing brief description and the following detailed description are exemplary and explanatory of this invention, and are not intended to be restrictive thereof or limiting of the advantages which can be achieved by this invention. Thus, the accompanying drawings, referred to herein and constituting a part hereof, illustrate preferred embodiments of this invention, and, together with the detailed description, serve to explain the principles of this invention.

BRIEF DESCRIPTION OF THE DRAWINGS

Additional aspects, features, and advantages of the invention, both as to its structure and operation, will be understood and will become more readily apparent when the invention is considered in the light of the following description of illustrative embodiments made in conjunction with the accompanying drawings, wherein.

DETAILED DESCRIPTION OF THE PREFERRED EMBODIMENT

The flight control system of the present invention is a fly-by-wire multi-axis flight control system that is fault-isolated, fault tolerant, fail-safe and fail-operational. Its architecture and operational details will be discussed in detail below in the context of an illustrative embodiment and with reference to the figures provided.

General Overview

The illustrative embodiment of the multi-axis serially redundant, single channel, multi-path fly-by-wire flight control system (FCS) of the present invention includes a single control channel architecture based on serially redundant flight computers and comprising within the channel a plurality of control paths each with its own dissimilar hardware flight control surface controllers, which paths together, in the single channel, provide manual and automatic control of the aircraft in each of the pitch, roll and yaw axes through a matrix of complementary distributed control surfaces responsive to commands generated by the flight computers in accordance with predetermined control law algorithms.

The fly-by-wire FCS of the present invention in the illustrative embodiment has two operation modes: Normal mode and Direct mode. The Normal mode is the system default operation mode and provides fully augmented flight control capability with flight envelope and structural protections. The Direct mode is command by wire, i.e. the pilot directly commands flight control surface position with stability augmentation and command limiting in pitch and yaw axes. A block diagram of the architecture of the illustrative fly-by-wire FCS according to the present invention is shown in FIG. 5.

Figure 1:
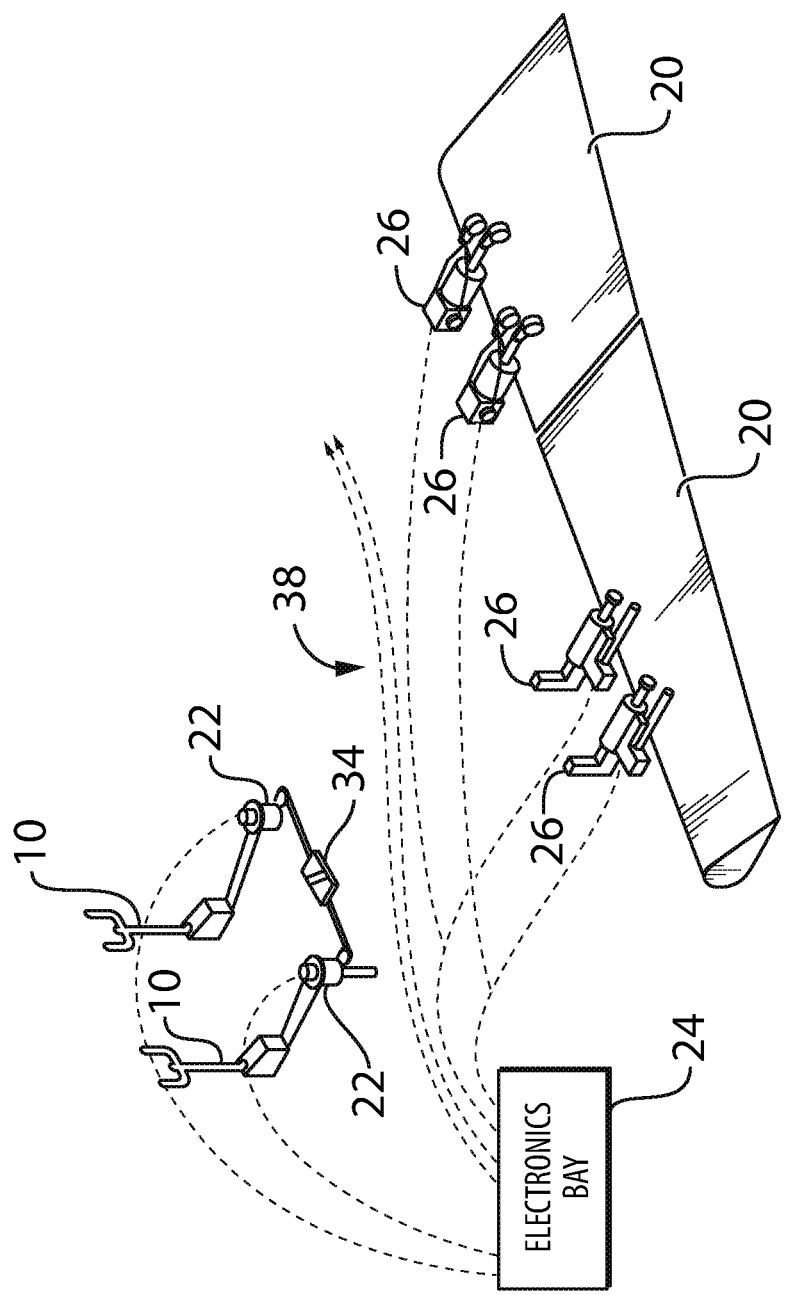
FIG. 1 is a general representation of a prior art fly-by-wire aircraft flight control system.
Figure 2:
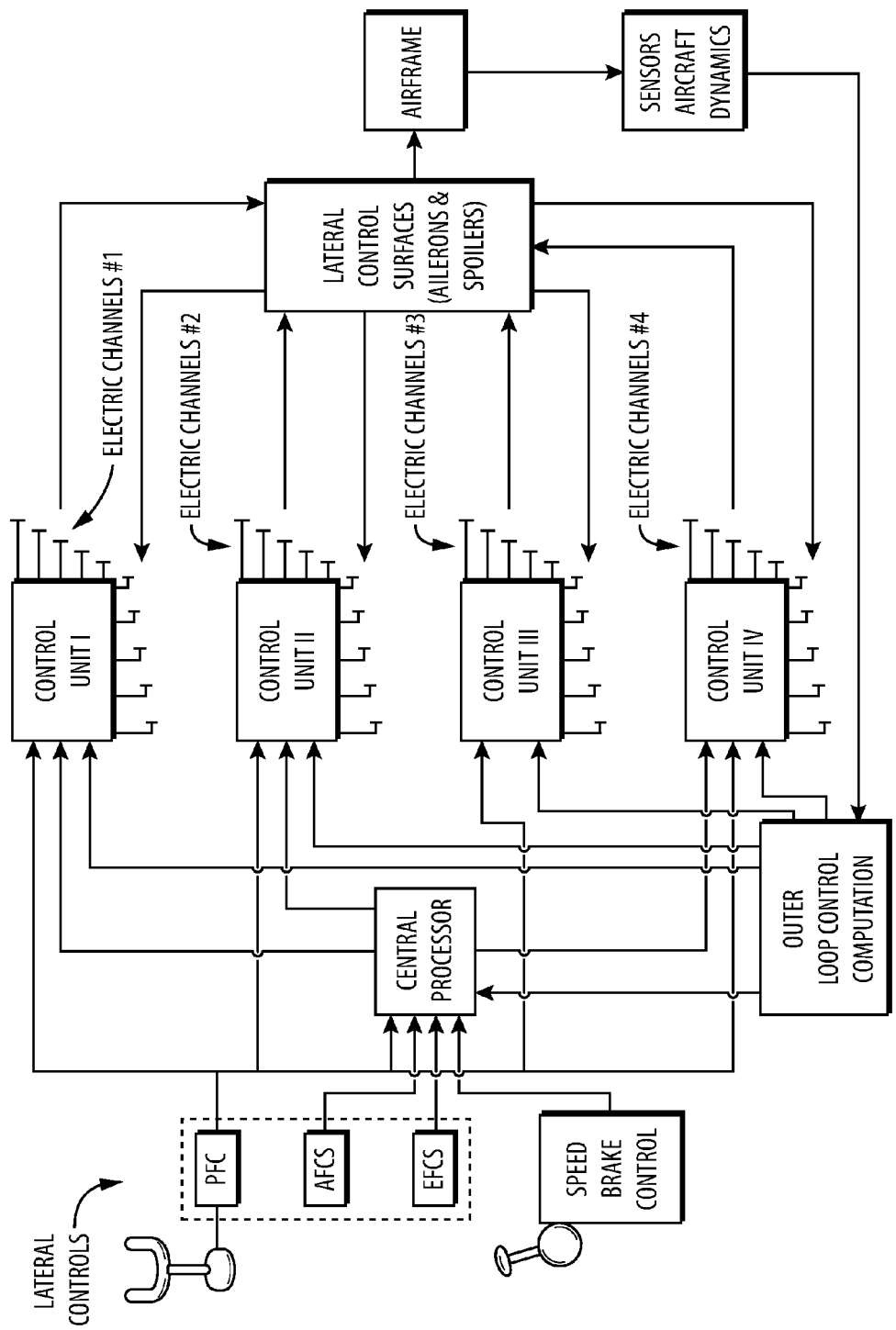
FIG. 2 is a simplified schematic diagram of a prior art fly-by-wire control system capable of controlling only one aircraft axis.
Figure 3:
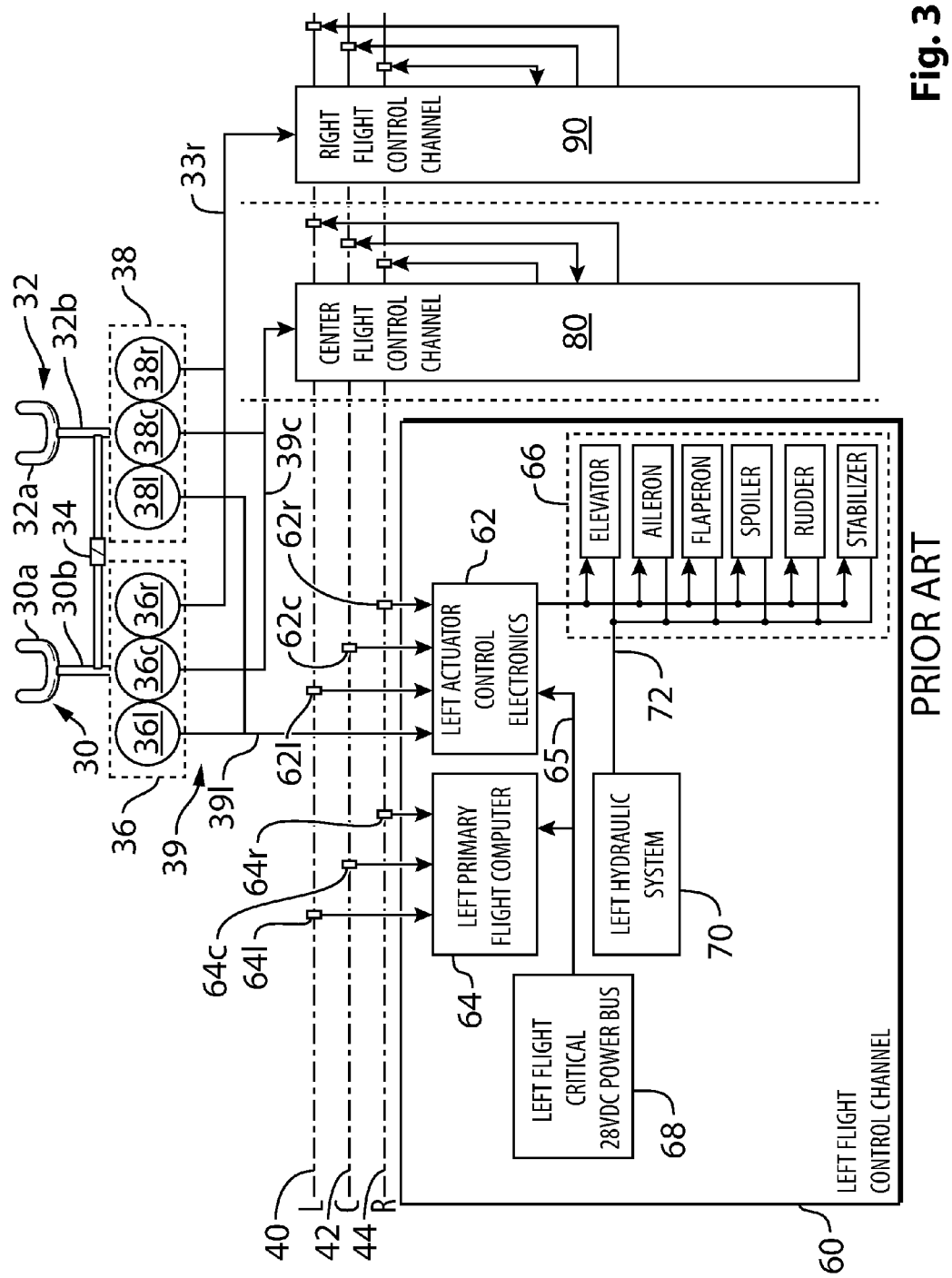
FIG. 3 is a block diagram of a known multi-channel, parallel redundant fly-by-wire control system.
Figure 4:
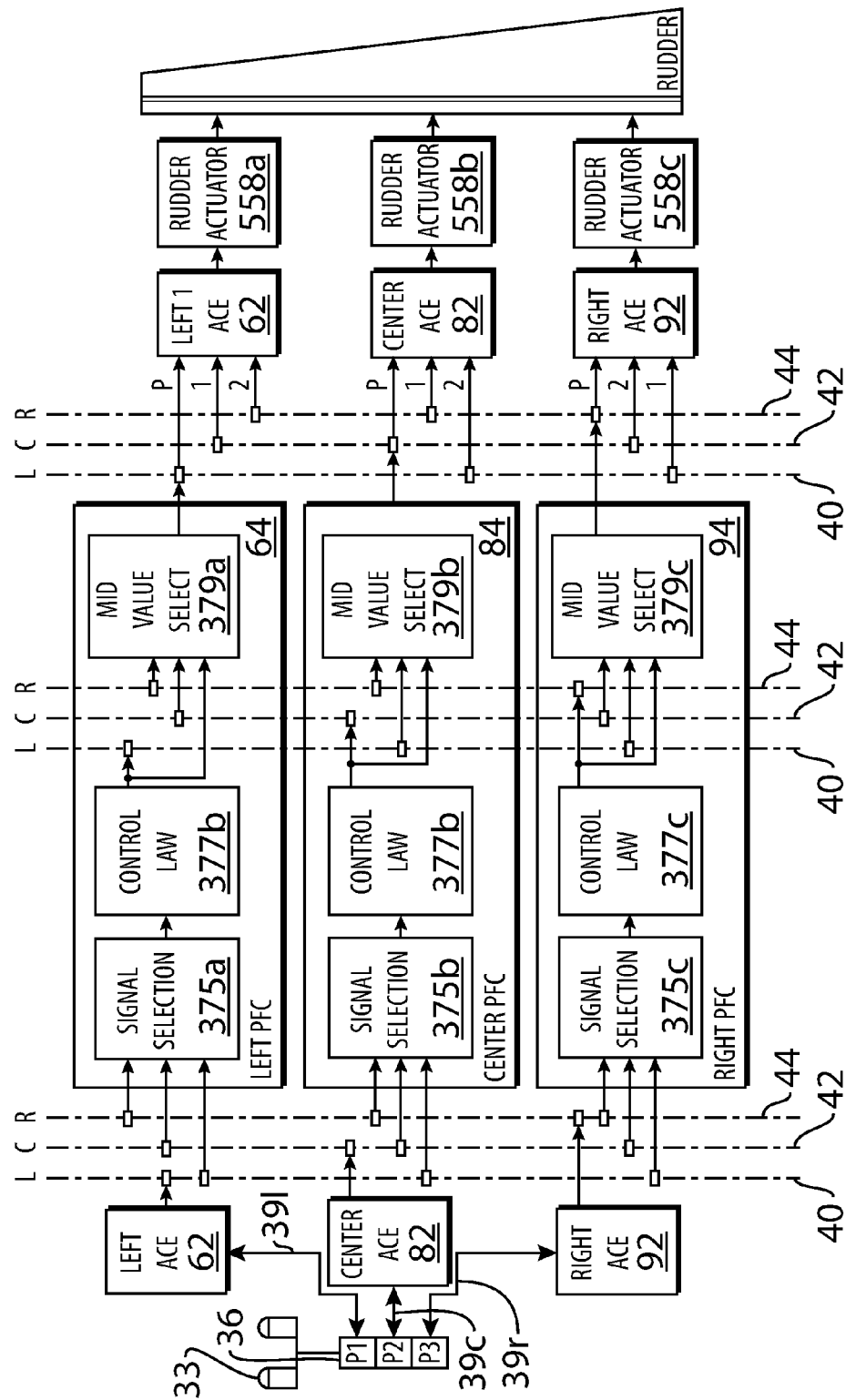
FIG. 4 is an operational diagram illustrating the multi-channel, cross-channel interactive, parallel operation of the fly-by-wire control system of FIG. 3.
Figure 5:
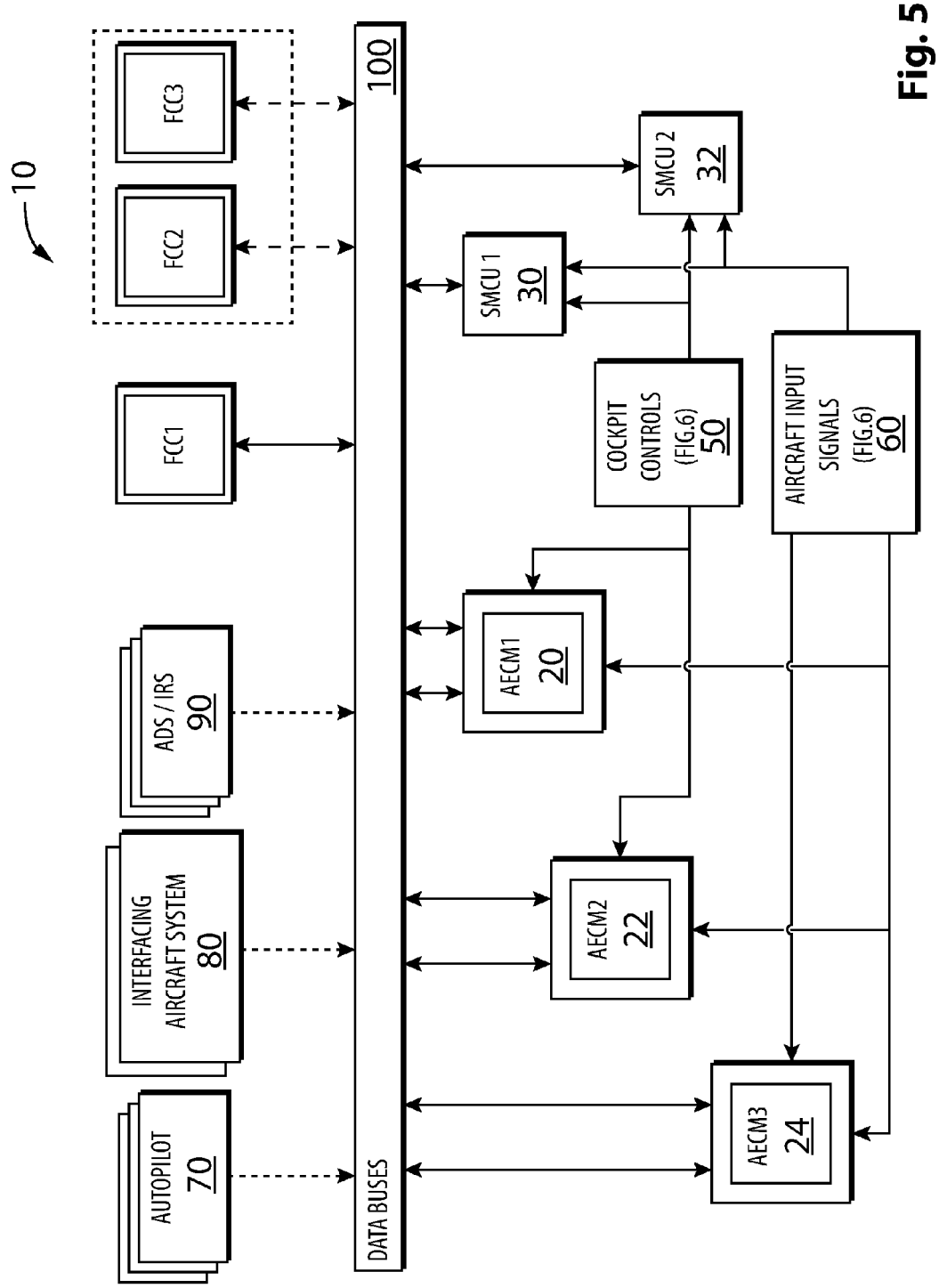
FIG. 5 is a block diagram of a serially redundant multi-axis fly-by-wire control system according to an illustrative embodiment of the present invention.

With reference to FIG. 5, the illustrative fly-by-wire FCS control system 10 comprises multiple flight control computers FCC1, FCC2 and FCC3, flight control surface controllers including actuator electronics control modules (AECM) 20, 22, 24 and stabilizer motor control units (SMCU) 30 and 32, cockpit controls 50, and aircraft sub-systems which provide aircraft input signals 60 and additional data from avionics (e.g. autopilot or navigation systems) 70, aircraft systems 80 and Air Data System (ADS)/Inertial Reference System (IRS) 90.

The signals from the various cockpit controls 50 and aircraft inputs 60 are received and processed by the AECMs and transmitted to the FCCs via data bus 100. The signals from the various cockpit controls 50 and selected aircraft inputs 60, in the current embodiment Flap/slat discrete data, are received and processed by the SMCUs and transmitted to the FCCs via data bus 100. Other systems e.g., avionics 70, aircraft systems 80 and ADS/IRS 90, also interface to data bus 100. In the present embodiment, the data bus architecture will include an ARINC 429 digital communication link, which is standard in the aircraft industry, and each FCC communicates with each AECM and SMCU through a dedicated ARINC 429 data bus; however, other types of data communication links could be used. For purposes of illustrative simplicity, a single data bus 100 is shown. Other bus configurations can be implemented, such as for example, using different bus protocols or multiple data buses, as will be understood by one skilled in the art.

In the illustrative embodiment, triple serial redundant Flight Control Computers FCC1, FCC2 and FCC3 perform Normal mode control/monitoring functions. As will be explained in detail infra, the FCCs each receive input from the AECMs and other above mentioned sources, via data bus 100, and calculate command signals based on control law algorithms implemented in the FCCs. Autopilot system 70 (FIG. 6) can provide computer control of the aircraft without the need for direct pilot or copilot input. Upon engagement of the autopilot system 70, the FCCs generate the flight surface commands based on signals received from the autopilot system 70 instead of the pilot control signals received from the AECMs.

While any single FCC (FCC1, FCC2 or FCC3) is capable of providing full control functionality in all aircraft axes, the three FCCs operate independently in an active/standby configuration, with no output command voting/comparison between the computers. In this active/standby scheme, while the three FCCs operate in synchronous fashion for failure mode operation as will be discussed in detail below, only one FCC is active at any given time: in this embodiment for example, one FCC (FCC1) is designated the default active "primary" FCC, and the other 2 FCCs (FCC2 and FCC3) each operate independently in a passive "standby" mode to serially come on-line as the "new" primary FCC in the event of failure of the prior active primary FCC (FCC1).

Figure 6:
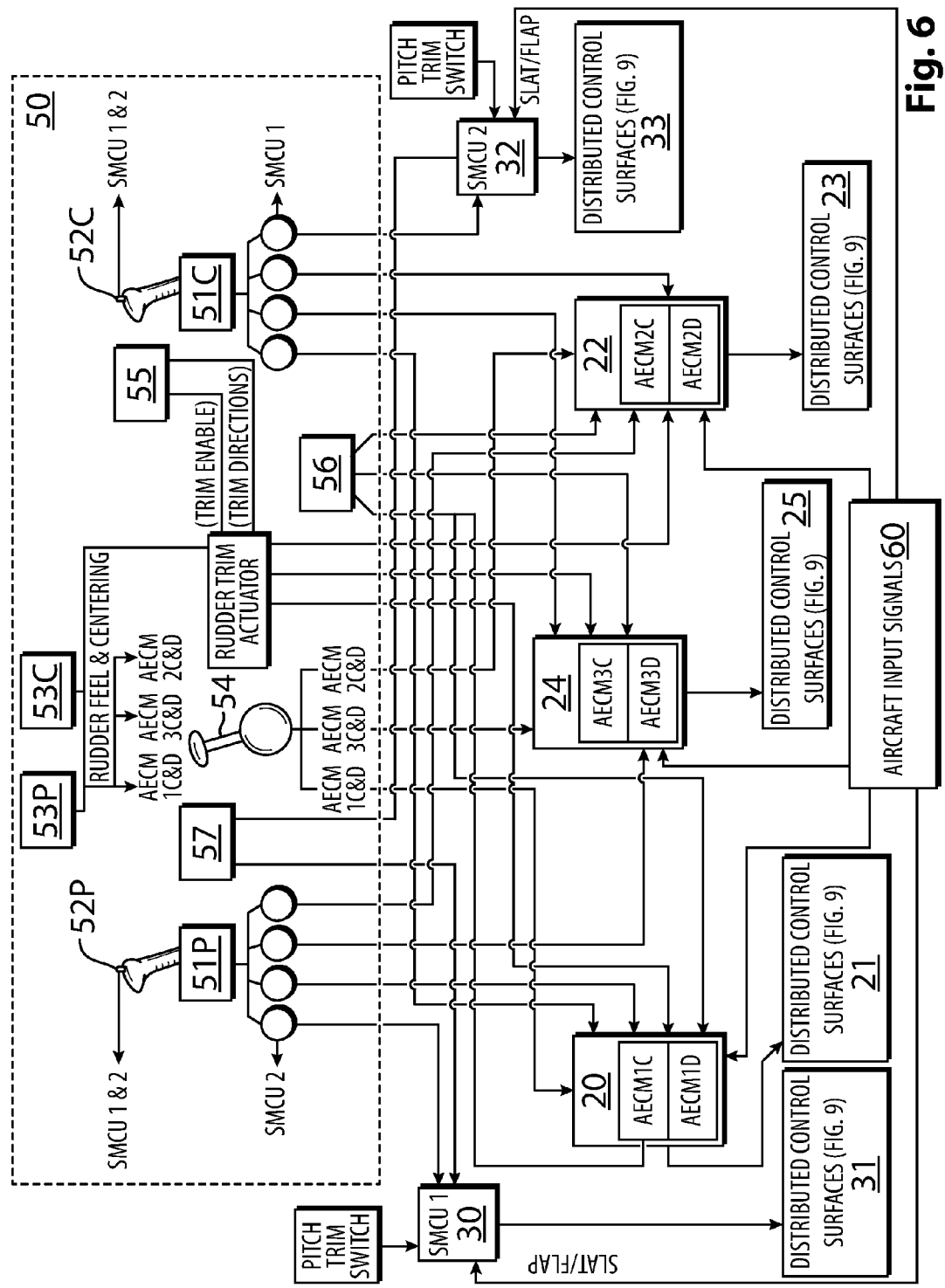
FIG. 6 is a detailed diagram of a portion of the FBW system of FIG. 5.

With reference to FIG. 6, the cockpit controls 50 and flight control surface controllers AECM and SMCU of FIG. 5 are described in further detail.

Cockpit controls 50 include a pilot and co-pilot sidestick controller 51P, 51C, each in a typical implementation of a pistol grip for inputting pitch and roll commands. The sidestick controllers 51P and 51C (through transducers which translate mechanical displacement to an electrical signal) each generate and provide signals (position or rate) which are coupled to each of the AECMs and SMCUs as shown. Each sidestick controller has a pitch trim switch 52P and 52C, which are coupled to each SMCU as shown.

Also included among the cockpit controls 50 are a set of pedals 53P and 53C for directional (rudder) control with rudder feel and centering, and rudder trim switch 55 for controlling the rudder trim actuator. Pedals 53P and 53C (through transducers which translate mechanical displacement to an electrical signal), and rudder trim switch 55, each generate and provide signals (position or rate) which are coupled to each of the AECMs as shown.

Cockpit controls 50 include stabilizer cutout switches 57 which provide input to each of the SMCUs, lateral trim switch 56 for controlling roll trim. Flight Spoiler Control Lever (FSCL) 54 which provides input to each of the AECMs and Sidestick Priority Inputs (such as Pilot, Co-Pilot Stick Priority and glareshield priority switches). The set of pitch trim switches (52P and 52C) generate appropriate pitch stabilizer trim command signal(s) which is/are transmitted to the FCC, via the SMCUs, over data bus 100, while the rudder trim (55) and lateral trim (56) switches generate appropriate rudder and roll stabilizer trim command signal(s) which is/are transmitted to the FCC, via the AECMs, over data bus 100. Other inputs 60 (as will be detailed in the discussion of FIG. 7) are also provided to the AECMs, which include Analog, Discrete and Sidestick Priority inputs.

In the discussed embodiment, multiple Actuator Electronic Control Modules (AECM), 20, 22 and 24, perform actuator servo loop closure and thereby control the associated distributed control surfaces (See FIG. 9) in Normal mode, based upon commands from the FCCs as will be discussed in detail. The AECMs also perform Direct mode control and monitoring functions as will be described.

In the exemplary embodiment, AECMs 20, 22, 24 are field programmable gate array (FPGA) based and each AECM comprises two hardware dissimilar submodules: AECM1 comprises submodules AECM1C and AECM1D; AECM2 comprises submodules AECM2C and AECM2D; and AECM3 comprises submodules AECM3C and AECM3D. By "dissimilar" in this context, is meant that type "C" AECM submodules are built with dissimilar, in this embodiment FPGA, hardware than type "D" AECM submodules. This has the benefit of increasing tolerance to generic failures. Although the type C and D AECM submodules are FPGA based in the present embodiment, the AECM submodules could be microprocessor based, or any other type of complex hardware devices, or constructed using only analog devices. In addition, the AECMs can be designed to include other than 2 submodules: 1 or more than 2, both within the teachings of the invention described herein. Also, the dissimilar hardware in each AECM submodule does not need to be of the same hardware type—in other words submodule C can be FPGA while submodule D can be microprocessor based. Such is within the scope of the present invention with required changes necessitated by hardware design choice being understood by those of ordinary skill.

Each submodule AECM1C, AECM1D, AECM2C, AECM2D, AECM3C and AECM3D constitutes a control path within the single flight control channel. Flight control surfaces are distributed such that each AECM submodule and consequently each AECM, operates independently and controls a different set of actuators related to each of the three flight control axes (pitch, roll and yaw) (see e.g., 21, 23 and 25 in FIG. 9). The two dissimilar submodules per AECM scheme constrains the failure effect of a complex hardware generic fault and allows for sufficient control for continued safe flight and landing in case of generic fault of AECM submodule type C or D.

Figure 9:
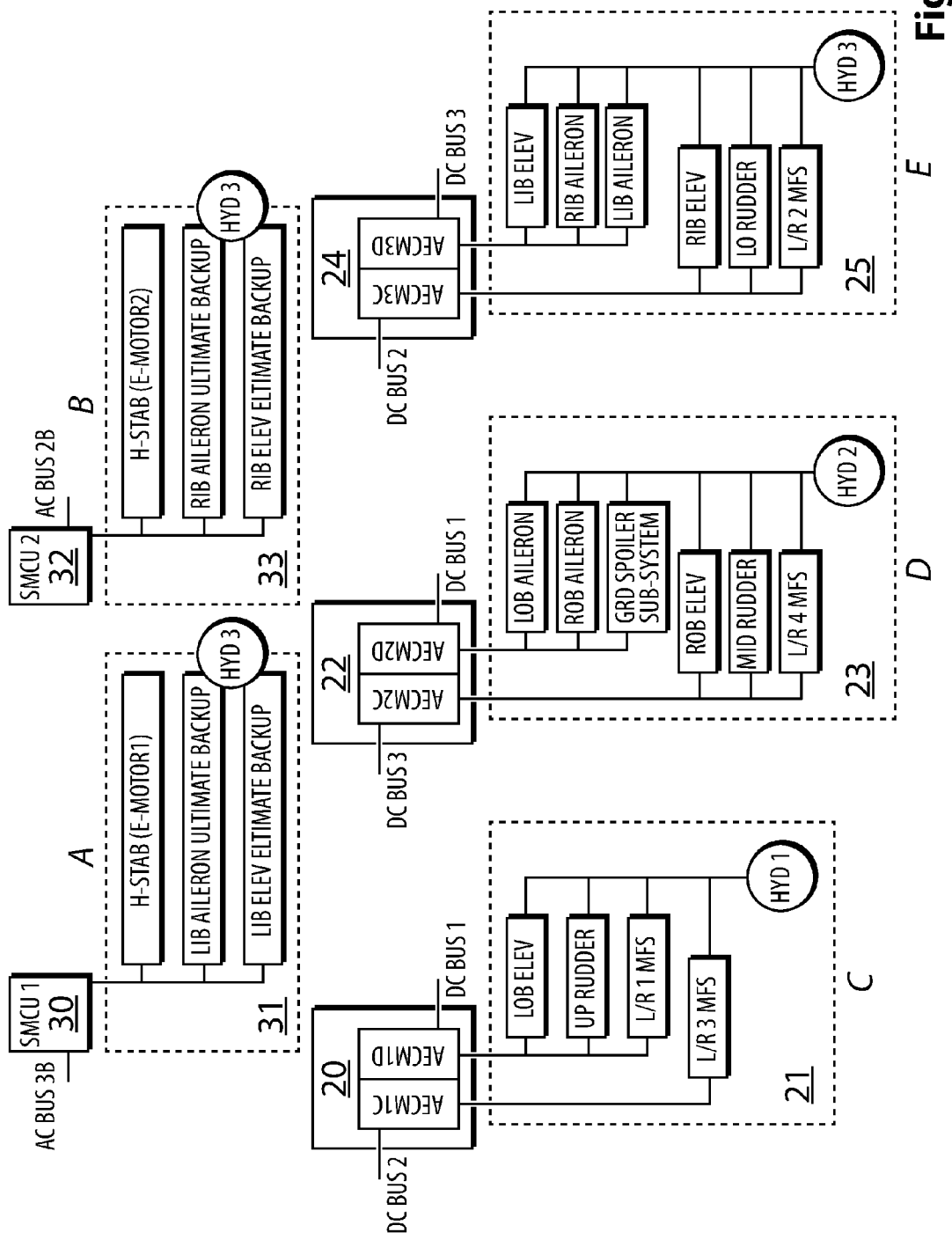
FIG. 9(A-E) is a diagram showing the distributed control surfaces of the AECMs and SMCUs illustrated in FIG. 6.

Two Stabilizer Motor Control Units (SMCUs) 30 and 32 are used in the illustrative embodiment to control the horizontal stabilizer trim actuator (HSTA) (see FIG. 9). As they control the HSTA for Normal and Direct mode horizontal stabilizer trim, the SMCUs are of a different design from (and therefore hardware dissimilar to) the AECMs. Similarly as for the AECMs, whereas each SMCU in the present embodiment is implemented as a single unit, the SMCUs could be designed to include 2 or more internal subunits.

In the illustrative embodiment, the SMCUs also include an analog-direct-link "ultimate" backup function which provides controllability of pitch trim, one elevator and one aileron actuators per SMCU. The ultimate backup function is not active during Normal or Direct mode operation but is only activated as a contingent last resort redundancy in the event of failure of both Normal and Direct modes, and will provide short term safe flight capability, e.g., while attempting to restore the primary flight control system to the Normal/Direct mode after a temporary drop off of all AECMs.

As used in the foregoing discussion and throughout the description of this exemplary embodiment of the present invention, and as will be understood from the preceding discussion, the term "flight control surface controller" is an abstracted term to convey a mechanism to control the various flight control surfaces of an aircraft. Many types of flight control surface controllers are known. The flight control surface controllers used in the illustrative embodiment of the present invention include the AECM and SMCU. In the description herein, the AECM is referred to at a system level as a module and the hardware design of each module is such that each module includes submodules. The SMCUs of the illustrative embodiment, on the other hand, are implemented as single units; that is, they are not internally implemented as multiple subunits in the way the AECMs are internally structured. Such naming convention has been used for purposes of illustrating functionality and operability and is not meant in and of itself to limit the architecture of the flight control surface controllers of the present invention. The redundant parallel functionality of the submodule implementation of the AECMs is one aspect of the invention. For purposes of illustration, in the example embodiment, the SMCUs are not designed with such internal parallel subunit redundancy, but may be if so desired.

Figure 7:
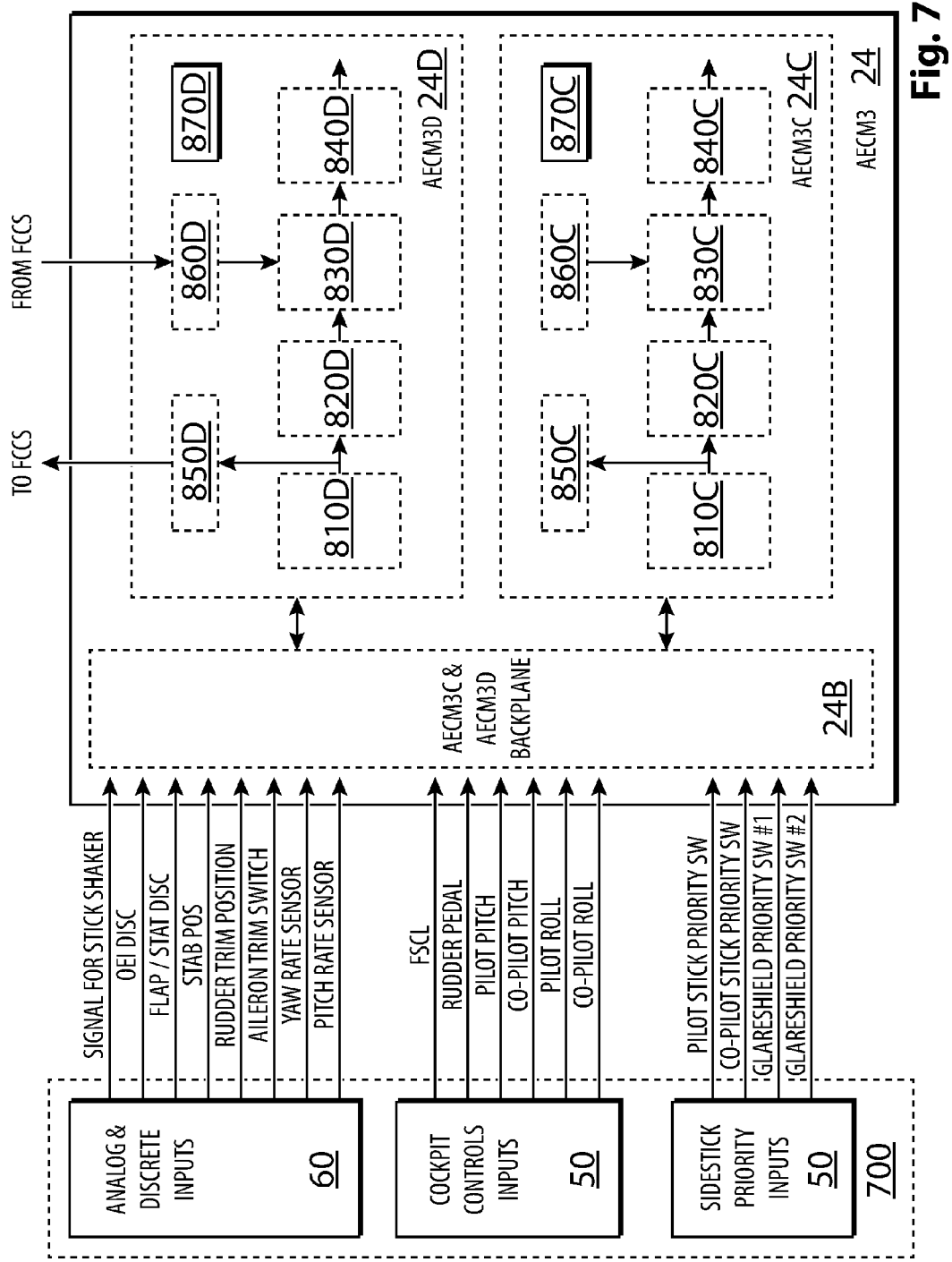
FIG. 7 is an illustrative block diagram showing an AECM of FIG. 6.
Figure 8:
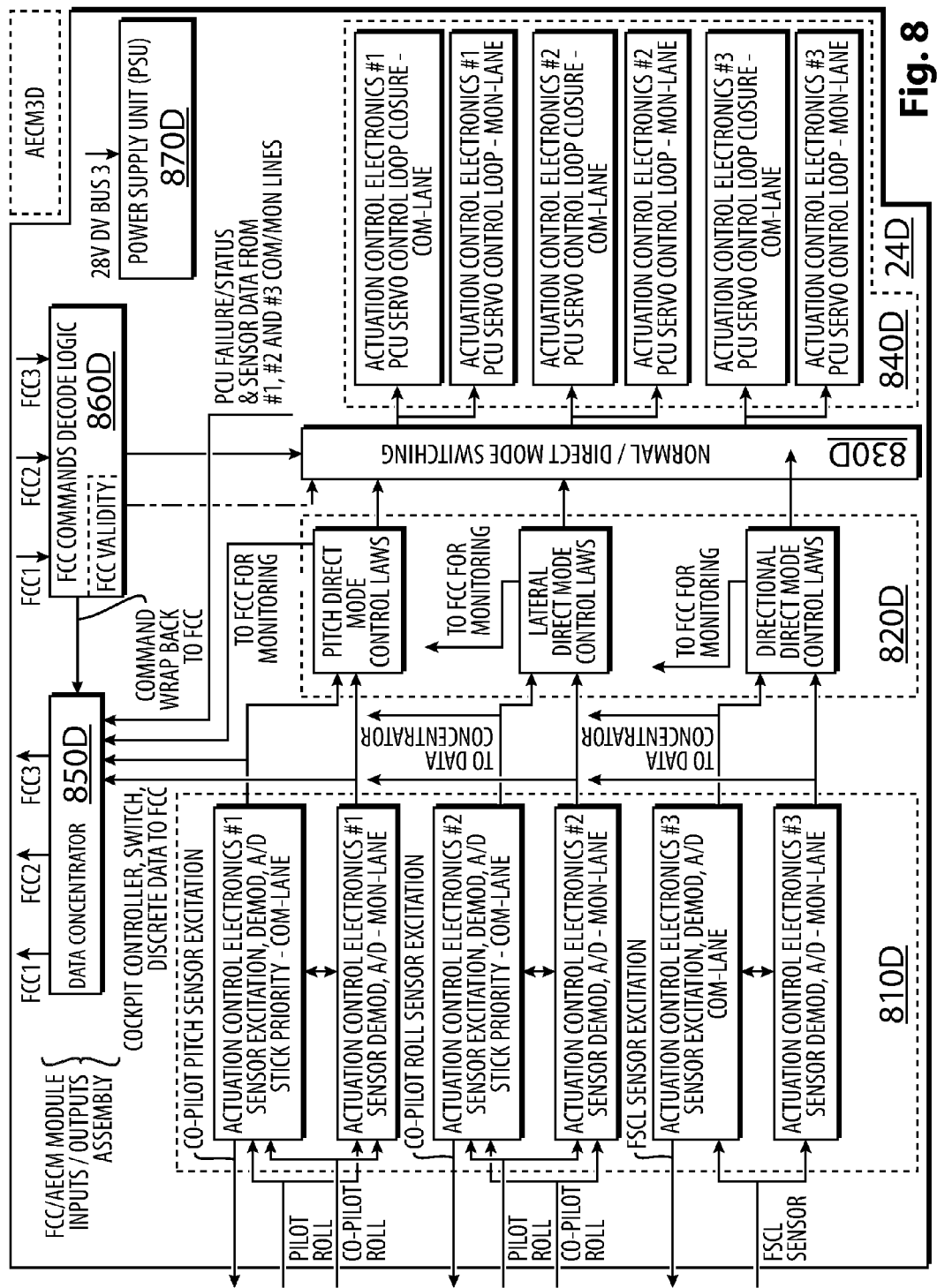
FIG. 8 is a detailed illustrative diagram of the AECM3D of FIG. 7.

With reference to FIGS. 7 and 8 and the detailed discussion of each figure which follows, AECM3 (24) is highlighted for illustration. In the exemplary embodiment described herein, AECM1 and AECM2 are similarly implemented.

As can be seen in the illustrative functional block diagram of FIG. 7, AECM3 (24) contains submodules AECM3C (24C) and AECM3D (24D). Each FCC (FCC1, FCC2 and FCC3) comprises command/monitor lanes with dual dissimilar processors (command lane—"A" type and monitor lane—"B" type) as explained in more detail below.

Inputs 700 to AECM3 include: Cockpit Control Inputs 50 (such as FSCL, rudder pedal, sidestick controllers for pilot and co-pilot pitch and roll control inputs); Analog & Discrete Inputs 60 (such as Signal for stickshaker pilot cues, OEI (One Engine Inoperative) discrete, Flap/slat discrete, Stabilizer position, Rudder trim position, Aileron trim switch, Yaw rate and Pitch rate sensors (for direct mode operation)); and Sidestick Priority Inputs 50 (as outlined above). All these inputs (700) are received through a common backplane 24B and the same inputs are shared between submodules AECM3C and AECM3D.

Since inputs 700 are analog or discrete signals, possible failures of these signals and their failure impacts to the system can be easily analyzed and verified during the fly-by-wire system design. Dissimilarity is thus not necessary and therefore is not included in the illustrative embodiment. In this way, the two types of AECM submodules share the same backplane (24B) and inputs (700) and therefore reduce the complexity of the AECM and the fly-by-wire system. However should dissimilarity or further isolation be desired, such is nonetheless within the scope of the present invention and may be included in system design, for example, through the implementation of two separate backplanes (one for each AECM submodule) as will be understood by those skilled in the art.

Actuation control input electronics block 810C, 810D receive and process inputs 700 and provide sensor excitation. Data concentrator 850C, 850D collects input signals from input electronics 810C, 810D and provides these signals to the FCCs via data bus 100. FCC command block 860C, 860D receives command signals generated by the individual FCCs.

In the (although highly improbable) event of a failure of all FCCs, all FCCs are taken off line and the system will revert to operate in AECM/SMCU Direct mode where the pilot will directly control the various aircraft surfaces. AECM/SMCU Direct mode operation is completely independent from FCC software/hardware and is responsive to cockpit controller inputs. Similarly, should loss of or insufficient aircraft sensor/system data occur, Normal Mode operation will be lost and the system will revert to Direct mode. The illustrative embodiment design is such as to minimize the possibility of common cause failure that would result in loss of both Normal and Direct modes.

Direct mode control law algorithms are implemented via Direct Mode Control Block 820C, 820D, which receives the input signals from block 810C, 810D.

Normal or Direct mode switching is controlled by switching block 830C, 830D that, in Normal mode, allows control of the control surfaces to be commanded by the primary FCC. When switched to Direct mode operation, the FCC command path is disengaged such that the pilot can control the aircraft via Direct mode control law paths in the Direct Mode Control Block 820C, 820D, as further outlined below.

Servo control electronics 840C, 840D responsive to either primary FCC commands in Normal mode or direct commands in Direct mode, are used to drive the respective control surfaces in response to calculated commands. Power supply 870C, 870D provides, in this case DC, power to the AECM.

As discussed above, the AECMs receive the cockpit control signals and execute the flight surface commands generated by the primary FCC in order to control the movement of the set of flight control surfaces associated with that AECM. In the illustrative embodiment, as previously discussed, each of the AECMs in the fly-by-wire system are interchangeable and are each designed to include 2 hardware dissimilar submodules so as to effectively constitute 6 AECMs governing 6 independent control paths.

With reference to FIG. 8, AECM functionality is discussed in detail, using submodule AECM3D (24D) for illustration. Implementation and operation of other AECM modules and submodules will be understood to be similar.

AECM3D has an internal DC power supply 870D that is connected to an independent power bus—in this case 28v DC bus 3. AECM3D (24D) includes a data bus interface (850D and 860D) that connects AECM3D to each FCC through data bus 100. In the present embodiment, AECM3D communicates with each FCC through an individual data bus, however, multiple common data buses could be used. AECM3 further includes an internal data bus on backplane 24B over which data within AECM3 is routed.

The cockpit control signals are applied via backplane 24B to actuation control input electronics block 810D. Input block 810D also receives analog and discrete signals as well as sidestick priority inputs (inputs 700 discussed above with respect to FIG. 7). Included within actuation control input electronics block 810D is cockpit (pilot/co-pilot) sensor excitation and demodulation circuitry.

After receiving the cockpit control signals in actuation control input electronics block 810D, an analog-to-digital (A/D) converter converts the control signals from an analog format to a digital format and transfers the converted cockpit control signals to the internal data bus for transmission as digital data to the FCCs over data bus 100. The digital data is also transmitted to block 820D, which will be used by the AECM Direct mode control law.

Data concentrator 850D collects all cockpit controller, switch and discrete data to supply to all FCCs (FCC1, FCC2 and FCC3).

In the FCCs, the cockpit control signals are combined with data obtained from the various sources discussed with respect to FIGS. 5-7, using control laws to calculate a set of flight surface commands that will be used by AECM3D to control its assigned set of flight control surfaces.

The calculated flight surface commands are transmitted from the FCCs (FCC1, FCC2 and FCC3) to AECM3D (24D) via data bus 100 where they are received by AECM3D through FCC Command Decode Logic block 860D. Block 860D also includes a sub block (FCC validity block), which checks for the FCC validity status and identifies the primary FCC.

Each FCC is comprised of a command lane and a monitor lane with dissimilar processors (type A processor for command lane and type B processor for monitor lane), which compare against one another. In a self-testing regime, a discrepancy outside a predetermined tolerance between the command and monitor lanes will result in the affected FCC taking itself offline and its status being set as invalid, that status indicated to the AECMs ("FCC invalid").

The primary FCC will be determined at the FCC level among three FCCs and indicated to the AECMs. Various alternatives of determining a primary FCC may be implemented, for example, a basic scheme could use priority logic such that FCC1 is the designated default primary FCC as long as FCC1 is valid and where FCC 1 is invalid, FCC2 would become primary as long as FCC2 is valid and so on. Other discrimination schemes may also be devised and implemented as will be understood.

Block 860D will receive and check for the FCC validity status (valid or invalid) and identify the functional primary FCC. Only the functional primary FCC commands will be used by AECM3D, however the primary FCC commands will not be sent through to the actuator servo control block 840D unless the primary FCC has been confirmed as valid.

With reference to FIG. 8, actuation control input electronics block 810D and input actuator servo control block 840D also implement a command and monitor lane architecture using parallel lanes for fault monitoring. Other fault monitoring schemes may also be devised and implemented as will be understood by those skilled in the art.

Although not illustrated above, the FCC validity sub block may also include other means for input signal checks, such as, Cyclic Redundancy Check (CRC), watchdog timer, etc. Also, the decoded FCC commands by block 860D could be wrapped back to the FCC for comparison with the FCC original commands to ensure that the correct FCC commands have been used by the AECM3D.

Normal/Direct Mode Switching Block 830D selectively connects servo loops that control the flight control surfaces to receive either the flight surface commands output from the primary FCC via FCC Command Decode Logic block 860D, or to receive signals generated from Direct mode control law block 820D (which direct mode control laws are illustrated to include Pitch, Lateral and Directional paths).

If the FCC validity block (sub block of 860D) detects that there is no valid FCC available, or no primary FCC available, it will instruct the switching block 830D to disconnect the FCC commands (block 860D) and to connect Direct mode control block 820D with the PCU servo controls (block 840D).

Thus, in Normal mode operation, FCC Command Decode Logic block 860D allows only the commands from the primary FCC, in this case FCC1, to pass through to Normal/Direct Mode Switching Block 830D to control the assigned flight control surfaces.

In Direct mode, the associated flight control surfaces are controlled directly in response to the cockpit control signals via direct mode control law block 820D.

In the illustrative embodiment discussed, in Normal mode, the flight control surface controllers, for example as discussed for AECM3 above, will each receive flight control commands from each of the FCCs (primary and standby) and FCC Command Decode Logic block 860D will forward only commands from the primary FCC to Normal/Direct Mode Switching block 830D, and consequently, the flight control surface servo loops are driven by the commands from the primary FCC. It will be understood by those skilled in the art that such command/control functionality can be, in alternative embodiments, integrated at other points in the control path of the single channel such that, for example, only the designated primary FCC transmits its flight commands onto the databus and/or that each flight control surface controller will only receive one set of flight control commands—i.e., those from the primary FCC. Such different scheme(s) would impose attendant changes in the illustrative embodiment as will be understood, such as in regards to placement of the FCC Command Decode Logic block 860D equivalent function where such function would be removed from the flight control surface controller and disposed at an appropriate place upstream in the control path. Nonetheless, moving such functionality to other segments of the control path in the single channel are considered to be within the scope of the present invention and to come under the teachings hereof, as the location of such functionality is not critical to such functionality in the context of the present invention. Other differences in implementation can also be devised where implementation will be accordingly effected.

As outlined above, the AECM submodules in the present embodiment are FPGA based, with the result that the majority of the functions in input block 810, control block 820, switching block 830 and control block 840 are performed by digital devices. As a result, in the present embodiment, A/D conversion occurs in input block 810 and D/A conversion occurs in control block 840. Alternatively, the AECMs could be analog based devices, in which case the A/D and D/A conversions would occur in data bus interfaces 850 and 860 respectively. Having analog based AECMs allows the design of FBW systems with direct mode operation occurring entirely analogically. The resulting advantage in simplicity and robustness may however be tempered by issues such as reduced flexibility during the development phase (in terms of scalability), reduced fault detection and maintenance capabilities, increased weight and higher life cycle costs. However, either embodiment is possible pursuant to the invention, as are others, and all will be deemed to be within the scope of the invention as described herein.

In either Normal or Direct mode operation, AECM3D controls the movement of a set of distributed flight control surfaces (See FIG. 9) by applying the flight control surface commands to the plurality of PCU servo control loops, each of which controls a hydraulic actuator connected to one of the flight control surfaces.

Also included among the AECM inputs 700 are pitch and yaw rate sensor (see analog inputs 60, FIG. 7) that provide rate damping input to the elevator or rudder servo loop when the fly-by-wire system is operated in the Direct mode.

With reference to FIG. 9, the single control channel architecture of the present invention controls the pitch, roll and yaw axes through a matrix of distributed control surfaces via multiple control paths.

Although not illustrated, deployment of flight control surfaces are generally understood and incorporated on the aircraft main wing and on the aircraft tail. The control surfaces included on the wings are ailerons and multifunction spoilers. The control surfaces included on the tail section include a rudder, elevators and stabilizer. In the illustrative embodiment of the fly-by-wire flight control system of the present invention, the control surfaces are split and/or controlled as follows. The aileron and elevators are divided into left and right side surfaces, each surface powered by two hydraulic actuators: left inboard (LIB) and left outboard (LOB), right inboard (RIB) and right outboard (ROB). The multifunction spoilers (MFS) are divided into left and right side 1st, 2nd, 3rd and 4th portions, each with a hydraulic actuator drive. The rudder is a single surface but driven by three hydraulic actuators: upper, middle and lower. The stabilizer is a single wing surface controlled by two drives (which in the illustrative embodiment are electric motors). The ground spoilers are divided into left and right surfaces, each powered by a single hydraulic actuator. The flight control surfaces (with the exception of the spoilers and rudder) are generally positioned by two actuators, each of which is controlled by a separate path distributed among the AECMs and SMCUs.

In the present embodiment, each AECM submodule in an AECM module is powered by a separate DC bus (for example, AECM 3D is powered by DC bus 3 and AECM 3C is powered by DC bus 2). However, redundant power supplies could also be used for each AECM submodule such that, for example, both DC bus 2 and DC bus 3 could supply power to each of AECM 3C and AECM 3D. Because of the higher DC Voltage requirement of the horizontal stabilizer trim actuator (when compared to the other actuators), the SMCUs are each provided AC power by different busses, which is then converted to the required DC Voltage by the SMCUs. Furthermore, in an alternative embodiment of the present invention, the AC power provided to the SMCUs can also be supplied from air driven generators thereby providing an extra level of redundancy.

Pitch axis control is effected under the illustrative embodiment of the present invention through the use of two elevators and one moveable Horizontal Stabilizer; minimum pitch control (needed for the aircraft continued safe flight and landing) can be maintained as long as both elevators are available, or any one elevator is available combined with the horizontal stabilizer trim. Roll axis control is effected under the illustrative embodiment of the present invention through two ailerons and four pairs of multifunction spoilers; minimum roll control (needed for the aircraft continued safe flight and landing) can be maintained by both ailerons, or by two pairs of MFS, or one aileron plus one pair of MFS, or any combinations of ailerons and MFS that can provide ⅓ of roll control power. Yaw axis control is effected the illustrative embodiment through a single rudder; while the rudder is used as the primary means for the aircraft yaw control, yaw axis control can also be achieved through the use of differential engine thrust, so that rudder control loss is not critical to aircraft safety. Such total rudder control loss however is not likely as any single rudder actuator (of the 3 rudder actuators) can operate the rudder so for there to be total rudder control loss, all three rudder actuators would need to fail at the same time, which is highly improbable. In addition to their role in controlling the lateral axis in flight, the multifunction spoilers also provide a speed brake function through the inputs from FSCL and, together with one pair of ground spoilers, provide the ground lift dump function.

In the present invention, the flight control surface actuators are distributed among the three AECMs/6 AECM submodules and two SMCUs so as to address and accommodate multiple AECM/SMCU failures. More specifically, the flight control surface actuators are distributed such that one of the AECMs—a "Critical" or "Super" AECM—can safely control the aircraft in the event that all remaining AECMs and all SMCUs would fail, with the other AECMs—the "Non-Critical AECMs"—being able to control the aircraft in the event that all remaining AECMs and all SMCUs but one would fail. In the illustrative embodiment, as can be understood through the selection of distributed control surfaces under its control, the Critical AECM is AECM3 and the Non-Critical AECMs are AECM1 and AECM2. As discussed, each AECM consist of two hardware dissimilar submodules (C and D), the flight control surface actuators are further distributed such that one set of AECM submodules can safely control the aircraft in the event that the other sets of AECM submodules and all SMCUs would fail. For example, in the illustrative embodiment, should all type "C" submodules suffer a generic fault (i.e. AECM1C, AECM2C and AECM3C), the remaining type "D" submodules (i.e. AECM1D, AECM2D and AECM3D) can safely control the aircraft even in the event that all SMCUs would fail.

In the illustrative embodiment of the invention, pitch axis control is achieved through the following flight control surface actuator distribution. As outlined above, minimum pitch axis control is achieved through control of both elevators or through control of one elevator and one horizontal stabilizer trim. With each elevator being controlled by 2 elevator actuators (for a total of four), one elevator actuator for each elevator is allocated to the Critical AECM, with each Non-Critical AECM receiving one of the remaining two elevator actuators. With respect to the allocation, within each AECM, the allocation of the elevator actuators is such that each set of controllers controls one elevator actuator for each elevator, i.e., each submodule (C and D) controls a left side and a right side elevator actuator. With the horizontal stabilizer trim being controlled by a single actuator, such actuator is redundantly allocated to each SMCU i.e. each of the motors that power the actuator is allocated to an SMCU. Finally, the elevator actuators allocated to the Critical AECM have redundant backup allocated to each SMCU.

In the illustrative embodiment of the present invention, roll axis control is achieved through the following flight control surface actuator distribution. As outlined above, minimum roll control is achieved through control of both ailerons, through control of two pairs of MFS or through control of one aileron and one pair of MFS (or through control of any combinations of ailerons and MFS that can provide ⅓ of roll control power). With each aileron being controlled by 2 aileron actuators (for a total of four), one aileron actuator for each aileron is allocated to the Critical AECM, with one Non-Critical AECM receiving the remaining two aileron actuators. With each pair of MFS being controlled by a pair of MFS actuators (for a total of 4 pairs of actuators), two pairs of MFS actuators are allocated to the Non-Critical AECM which is not allocated an aileron actuator, with the other Non-Critical AECM and the Critical AECM each receiving a pair of MFS actuators. Finally, the ailerons actuators allocated to the Critical AECM have redundant backup allocated to each SMCU.

Finally, in the illustrative embodiment, yaw axis control is achieved through the following flight control surface actuator distribution. As outlined above, minimum yaw control is achieved through control of the single rudder. With the rudder being capable of being operated by any single rudder actuator (out of the 3), each such actuator is allocated to each AECM.

The above flight control surface actuator distribution is complemented with the hydraulic power and electrical power allocations to ensure that the aircraft can be controlled safely in the event of loss of any two hydraulic systems, or loss of any two electrical buses, or loss of any one hydraulic system combined with any one electrical bus. In the illustrative embodiment, each DC Power source is allocated to 2 of the 6 AECM controllers, so that each AECM is powered by a different power source combination. Each SMCU is powered by a dedicated AC Power source. With respect to hydraulic power systems, each of the three AECM modules is allocated a different hydraulic power source, with the Critical AECM being allocated the hydraulic power source that is the more failure tolerant (in the exemplary embodiment, such hydraulic power source is tolerant of double engine failure). Such more failure tolerant hydraulic power source also is allocated to the SMCUs. For further failure tolerance, the horizontal stabilizer trim actuator is powered not by hydraulic power sources but by electrical motors.

Shown in FIG. 9 are the distributed flight surfaces/actuators of the fly-by-wire FCS of the illustrative embodiment of the present invention, which satisfy all above criteria for actuator distribution.

Shown in the following tables are the flight control surfaces/actuators controlled by a particular AECM controller and SMCU, and the power (hydraulic and electrical) supplied in the illustrative embodiment.

FIG. 9A SMCU1 (30)

| Actuator Power | Control Unit Power | Allocated Surface |
|---|---|---|
| E-Motor 1 | 3B (AC) | Horizontal Stabilizer |
| Hydraulic System 3 | 3B (AC) | LIB aileron ultimate backup |
| Hydraulic System 3 | 3B (AC) | LIB Elevator ultimate backup |

The LIB aileron ultimate backup and LIB elevator ultimate backup are hydraulic actuated in this embodiment; however, they may also be electrically actuated.

FIG. 9B SMCU2 (32)

| Actuator Power | Control Unit Power | Allocated Surface |
|---|---|---|
| E-Motor 2 | 2B (AC) | Horizontal Stabilizer |
| Hydraulic System 3 | 2B (AC) | RIB aileron ultimate backup |
| Hydraulic System 3 | 2B (AC) | RIB Elevator ultimate backup |

The RIB aileron ultimate backup and RIB elevator ultimate backup are hydraulic actuated in the illustrative embodiment; however, they also can be electrically actuated.

FIG. 9C AECM1C (AECM1 20)

| Actuator Power | Control Unit Power | Allocated Surface |
|---|---|---|
| Hydraulic System 1 | 2 (DC) | L/R 3 MFS |

FIG. 9C AECM1D (AECM1 20)

| Actuator Power | Control Unit Power | Allocated Surface |
|---|---|---|
| Hydraulic System 1 | 1 (DC) | Elevator/LOB actuator |
| Hydraulic System 1 | 1 (DC) | Rudder/UP actuator |
| Hydraulic System 1 | 1 (DC) | L/R 1 MFS |

FIG. 9D AECM2C (AECM2 22)

| Actuator Power | Control Unit Power | Allocated Surface |
|---|---|---|
| Hydraulic System 2 | 3 (DC) | Elevator/ROB actuator |
| Hydraulic System 2 | 3 (DC) | Rudder/MID actuator |
| Hydraulic System 2 | 3 (DC) | L/R 4 MFS |

FIG. 9D AECM2D (AECM2 22)

| Actuator Power | Control Unit Power | Allocated Surface |
|---|---|---|
| Hydraulic System 2 | 1 (DC) | Aileron/LOB actuator |
| Hydraulic System 2 | 1 (DC) | Aileron/ROB actuator |
| Hydraulic System 2 | 1 (DC) | GRD Spoiler sub-system |

FIG. 9E AECM3C (AECM3 24)

| Actuator Power | Control Unit Power | Allocated Surface |
|---|---|---|
| Hydraulic System 3 | 2 (DC) | Elevator/RIB actuator |
| Hydraulic System 3 | 2 (DC) | Rudder/LO actuator |
| Hydraulic System 3 | 2 (DC) | L/R 2 MFS |

FIG. 9E AECM3D (AECM3 24)

| Actuator Power | Control Unit Power | Allocated Surface |
|---|---|---|
| Hydraulic System 3 | 3 (DC) | Elevator/LIB actuator |
| Hydraulic System 3 | 3 (DC) | Aileron/RIB actuator |
| Hydraulic System 3 | 3 (DC) | Aileron/LIB actuator |

In Normal mode operation, fully augmented flight control as described above is achieved through the distributed control surfaces.

In Direct mode, the pilot directly commands control surface position. Stability augmentation and command limiting in pitch and yaw axes are provided in direct mode (in part via pitch and yaw rate feedback). A principle design criteria in this distribution of power and AECM/SMCU control is to ensure that under even severe failure conditions, airplane controllability is maintained at a minimum level such as to allow safe flight. As will be appreciated, the distribution matrix provides fault-isolated, fault tolerant, fail-safe and fail-operational functionality without loss of ability to safely control the aircraft.

The present invention has been illustrated and described with respect to specific embodiments thereof, which embodiments are merely illustrative of the principles of the invention and are not intended to be exclusive or otherwise limiting embodiments. For instance, although the description provided hereinabove along with the accompanying drawings illustrate particular embodiments incorporating one or a few features of the present invention, those skilled in the art will understand in view of the hereinabove disclosure that alternative configurations can be devised and implemented, as well as other designs capable of achieving the purpose and benefits of the discussed aspects of the invention.

Accordingly, although the above description of illustrative embodiments of the present invention, as well as various illustrative modifications and features thereof, provides many specificities, these enabling details should not be construed as limiting the scope of the invention, and it will be readily understood by those persons skilled in the art that the present invention is susceptible to many modifications, adaptations, variations, omissions, additions, and equivalent implementations without departing from this scope and without diminishing its attendant advantages. It is further noted that the terms and expressions have been used as terms of description and not terms of limitation. There is no intention to use the terms or expressions to exclude any equivalents of features shown and described or portions thereof. It is therefore intended that the present invention is not limited to the disclosed embodiments but should be defined in accordance with the claims that follow.

What is claimed is:

1. A fly-by-wire flight control system of an aircraft, the system comprising:
    a plurality of input controls, each one of the plurality of input controls being capable of generating a signal indicative of a commanded position of at least one flight control surface;
    a plurality of flight control computers, each one of the plurality of flight control computers being capable of generating flight surface control commands according to predetermined flight control algorithms in part as a function of the signal, wherein at least one of the plurality of flight control computers comprises a command lane and a monitor lane capable of comparing against one another, the at least one of the plurality of flight control computers being capable of determining that it is invalid based on a self-testing regime; and
    a plurality of flight control surface controllers, each one of the plurality of flight control surface controllers being capable of controlling the at least one flight control surface based on at least one of (i) the flight surface control commands generated by at least one of the plurality of flight control computers and (ii) the signal.

2. The fly-by-wire flight control system of claim 1, wherein at least another one of the plurality of flight control computers is capable of becoming an active primary flight control computer upon determination by the at least one of the plurality of flight control computers that it is invalid.

3. The fly-by-wire flight control system of claim 2, wherein the at least another one of the plurality of flight control computers is capable of becoming the active primary flight control computer based on (i) a determination by the at least one of the plurality of flight control computers that it is invalid and (ii) a priority logic.

4. The fly-by-wire flight control system of claim 1, wherein at least one of the plurality of flight control surface controllers, upon determining that none of the plurality of flight control computers is capable of becoming an active primary flight control computer, is capable of being commanded according to predetermined flight control algorithms for direct mode operation in response to the signal.

5. The fly-by-wire flight control system of claim 1, wherein the self-testing is configured so that a discrepancy outside a predetermined tolerance between the command lane and the monitor lane results in the at least one of the plurality of flight control computers setting its status as invalid.

6. The fly-by-wire flight control system of claim 5, wherein at least one of the plurality of flight control surface controllers is being indicated that the status of the at least one of the plurality of flight control computers is invalid.

7. The fly-by-wire flight control system of claim 1, wherein the self-testing is configured so that a discrepancy outside a predetermined tolerance between the command lane and the monitor lane results in the at least one of the plurality of flight control computers taking itself offline.

8. The fly-by-wire flight control system of claim 1, wherein the command lane and the monitor lane have dissimilar processors.

9. The fly-by-wire flight control system of claim 1, further comprising a validity block configured to detect whether no valid flight control computer amongst the plurality of flight control computers is available and further configured to instruct a switching block to disconnect flight surface control commands and to connect direct mode control.

* * * * *